(12) United States Patent
O'Bleness et al.

(10) Patent No.: US 9,058,272 B1
(45) Date of Patent: Jun. 16, 2015

(54) METHOD AND APPARATUS HAVING A SNOOP FILTER DECOUPLED FROM AN ASSOCIATED CACHE AND A BUFFER FOR REPLACEMENT LINE ADDRESSES

(71) Applicant: Marvell International Ltd., Hamilton (BM)

(72) Inventors: Frank O'Bleness, Tempe, AZ (US); Sujat Jamil, Gilbert, AZ (US); David Miner, Chandler, AZ (US); Joseph Delgross, Chandler, AZ (US); Tom Hameenanttila, Phoenix, AZ (US); Jeffrey Kehl, Chandler, AZ (US); Adi Habusha, Haifa (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/134,553

(22) Filed: Dec. 19, 2013

Related U.S. Application Data

(60) Continuation of application No. 13/618,397, filed on Sep. 14, 2012, now abandoned, which is a division of application No. 12/419,215, filed on Apr. 6, 2009, now abandoned.

(Continued)

(51) Int. Cl.
*G06F 12/08* (2006.01)
*G06F 12/12* (2006.01)

(52) U.S. Cl.
CPC .... *G06F 12/0831* (2013.01); *G06F 2212/1024* (2013.01); *G06F 12/0822* (2013.01);
(Continued)

(58) Field of Classification Search
CPC ............ G06F 12/0822; G06F 12/0831; G06F 12/0864; G06F 12/082; G06F 12/0815; G06F 12/0817; G06F 2212/1024; G06F 2212/1028; G06F 2212/6032; G06F 2212/69; G06F 12/128
USPC ..................................... 711/122, 146
See application file for complete search history.

(56) References Cited

U.S. PATENT DOCUMENTS

| 5,713,004 A | 1/1998 | Kimmel et al. ................ 711/145 |
| 5,774,685 A | 6/1998 | Dubey .......................... 712/205 |

(Continued)

FOREIGN PATENT DOCUMENTS

GB          2439650 A       1/2008

OTHER PUBLICATIONS

"Method for Filtering Internal Snoop Events Using Qualified Coherence States," disclosed anonymously, IP.com Prior Art Database, Electronic Publication Date Sep. 21, 2005, pp. 1.5.

*Primary Examiner* — Sanjiv Shah
*Assistant Examiner* — Glenn Gossage

(57) ABSTRACT

An apparatus including a snoop filter decoupled from a cache and an associated method for snoop filtering are disclosed. The snoop filter is decoupled from the cache such that the cache changes states of lines in the cache from a first state that is a clean state, such as an exclusive (E) state, to a second state that is not a clean state, such as a modified (M) state, without the snoop filter's knowledge. The snoop filter buffers addresses of replaced lines that are unknown to be clean until a write-back associated with the replacement lines occurs, or until actual states of the replaced lines are determined by the snoop filter generating a snoop. A multi-level cache system in which a reallocation or replacement policy is biased to favor replacing certain lines such as inclusive lines, non-temporal lines or prefetched lines that have not been accessed, is also disclosed.

17 Claims, 7 Drawing Sheets

Related U.S. Application Data

(60) Provisional application No. 61/047,971, filed on Apr. 25, 2008, provisional application No. 61/048,374, filed on Apr. 28, 2008, provisional application No. 61/048,389, filed on Apr. 28, 2008.

(52) U.S. Cl.
CPC ........... *G06F12/128* (2013.01); *G06F 2212/69* (2013.01); *G06F 12/0864* (2013.01); *G06F 2212/6032* (2013.04)

(56) References Cited

U.S. PATENT DOCUMENTS

| | | | |
|---|---|---|---|
| 5,937,429 A | 8/1999 | Kumar et al. | 711/133 |
| 6,226,713 B1 | 5/2001 | Mehrotra | 711/118 |
| 6,959,364 B2 * | 10/2005 | Safranek et al. | 711/146 |
| 7,213,106 B1 | 5/2007 | Koster et al. | 711/119 |
| 8,751,753 B1 * | 6/2014 | Rozas | 711/146 |
| 2001/0049771 A1 | 12/2001 | Tischler et al. | 711/133 |
| 2003/0135696 A1 | 7/2003 | Rankin et al. | 711/136 |
| 2003/0177317 A1 | 9/2003 | Anderson et al. | 711/146 |
| 2004/0133748 A1 | 7/2004 | Yang | 711/144 |
| 2004/0260880 A1 | 12/2004 | Shannon et al. | 711/122 |
| 2006/0053258 A1 | 3/2006 | Liu et al. | 711/145 |
| 2006/0064547 A1 | 3/2006 | Kottapalli et al. | 711/133 |
| 2006/0080508 A1 | 4/2006 | Hoover et al. | 711/133 |
| 2007/0038814 A1 | 2/2007 | Dieffenderfer et al. | 711/141 |
| 2007/0214321 A1 | 9/2007 | Shannon et al. | 711/122 |
| 2007/0233965 A1 * | 10/2007 | Cheng et al. | 711/146 |
| 2007/0233966 A1 * | 10/2007 | Chinthanmani et al. | 711/146 |

\* cited by examiner

METHOD AND APPARATUS HAVING A SNOOP FILTER DECOUPLED FROM AN ASSOCIATED CACHE AND A BUFFER FOR REPLACEMENT LINE ADDRESSES

INCORPORATION BY REFERENCE

This application is a continuation of U.S. patent application Ser. No. 13/618,397, "Method and Apparatus for Efficient Snoop Filter Coverage in a Multi-Level Cache System" filed Sep. 14, 2012, now abandoned, which is a divisional of U.S. patent application Ser. No. 12/419,215, filed Apr. 6, 2009, now abandoned, which in turn claims the benefit of priority from U.S. Provisional Patent Application No. 61/047,971, filed Apr. 25, 2008, entitled "Biased Line Replacement Policy to Favor Specific Cache Line Allocation Policies," U.S. Provisional Patent Application No. 61/048,374, filed Apr. 28, 2008, entitled "Opportunistic Snoop Filtering in Multi-Level Cache Hierarchies," and U.S. Provisional Patent Application No. 61/048,389 filed Apr. 28, 2008, entitled "Method and Apparatus for Efficient Snoop Filter Coverage." The entire disclosures of the above-identified applications are incorporated herein by reference in their entirety.

FIELD OF THE INVENTION

The present invention relates generally to the field of cache architectures, processor architectures, and hardware cache coherency.

DESCRIPTION OF THE RELATED ART

A snoop request can be used to determine if a requested line already exists in a cache to avoid fetching duplicate lines from memory. A snoop filter may be implemented to help lessen the traffic to the cache(s) and improve memory performance. A snoop filter also may track the contents of the cache in order to avoid needlessly consuming cache bandwidth with requests for non-cached lines. However, using a snoop filter generally requires additional discrete hardware and protocols.

In a multi-level cache system, the first-level (e.g., the lowest-level) of cache accessed by the system instructions is the most sensitive to bandwidth concerns. A system snoop request of a lower-level cache may therefore utilize performance critical bandwidth when the cache is close to the instruction flow. Furthermore, although snoop requests successfully resolved by the snoop filter may require only minimal action at the associated cache(s), unresolved snoop requests are treated as a miss and are then resolved by snooping the associated cache(s) the snoop filter covers.

SUMMARY

Embodiments described in the present application are directed to the implementation of a snoop filter in a multi-level cache system. One level of cache may be implemented as a snoop filter for the associated lower levels of cache. Each layer of cache may implement a cache coherency protocol or a reallocation policy that may be biased to favor replacing non-inclusive lines in the lower levels of cache. The snoop filter may use the coherency protocols or the biased reallocation policies to ensure that the snoop filter is substantially inclusive of the lines in the lower levels of cache to avoid snooping the lower levels of cache. The snoop filter may implement an address buffer to allow for efficient decoupling from the lower levels of cache.

Embodiments of the present invention are directed to a method for snoop filtering. The method includes receiving, by a snoop filter, requests on a system bus. The snoop filter is decoupled from an associated cache such that the cache changes states of lines in the cache from a first state that is a clean state, such as an exclusive (E) state, to a second state that is not a clean state, such as a modified (M) state, without the snoop filter's knowledge. Further, the method includes buffering, by the snoop filter, addresses of replaced lines that are unknown to be clean.

Embodiments of the present invention are also directed to an apparatus including a snoop filter. The snoop filter is decoupled from an associated cache such that the associated cache changes states of lines in the cache from a first state that is a clean state, such as an exclusive (E) state to a second state that is not a clean state, such as a modified (M) state, without the snoop filter's knowledge. The snoop filter includes a buffer configured to buffer addresses of replaced lines that are unknown to be clean.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Objects and advantages of the present invention will become apparent from the following detailed description.

In a multi-level cache system, the upper-levels of cache may have larger capacity or less critical bandwidth concerns than the lower-level cache(s). An upper-level cache can be utilized as a snoop filter that covers associated lower-level cache(s), thereby increasing efficiency by resolving snoop requests via access to the upper level cache.

Figure 1:
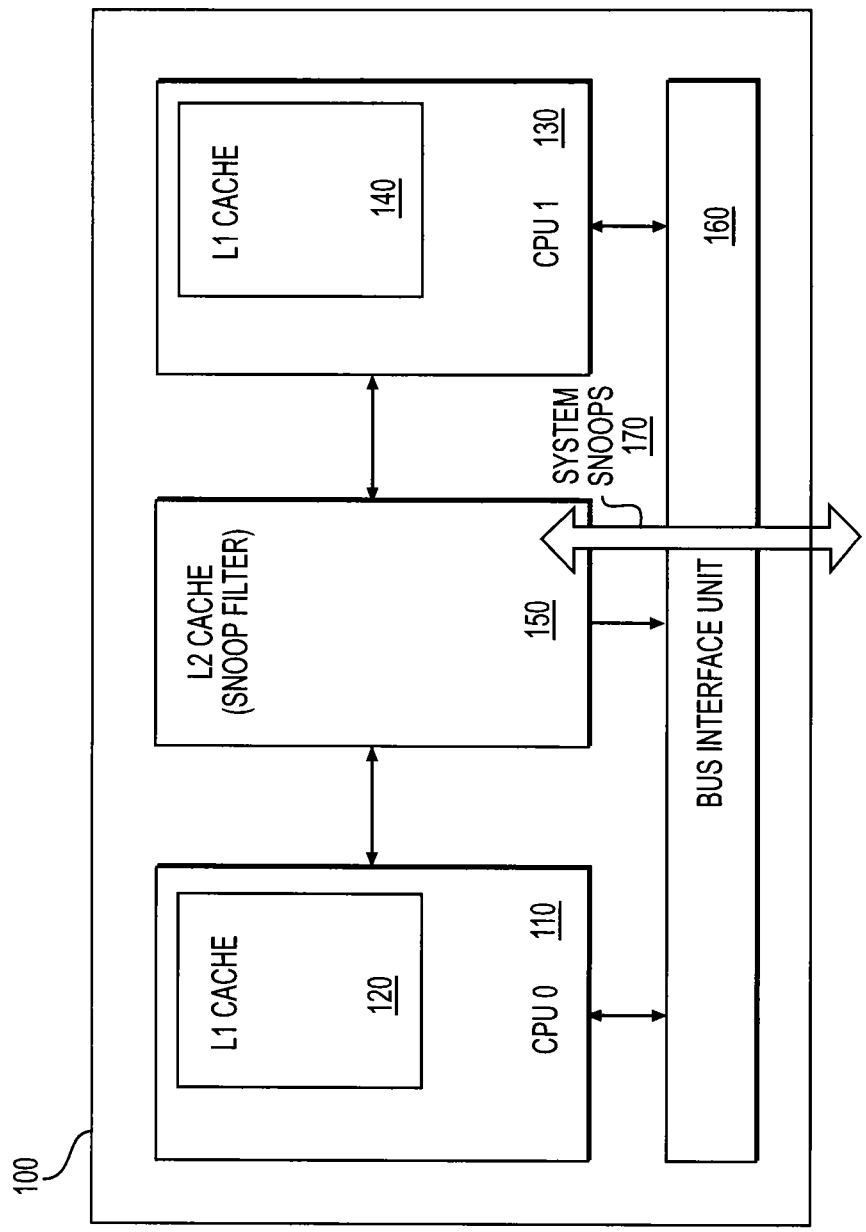
FIG. 1 shows a multi-level cache system wherein the higher level cache may function as a snoop filter.

FIG. 1 illustrates one embodiment of a system 100 with a multi-level cache, wherein the L2 (level 2) cache 150 acts as a snoop filter for both the lower-level L1 (level one) cache 120 associated with central processing unit CPU0 110 and the L1 cache 140 associated with CPU1 130. System snoops such as a snoop request 170 can be sent to any level of cache to determine if a required line remains in that cache. However, cache bandwidth becomes more performance-critical the closer the cache level is to instruction execution. Since the snooping process consumes the performance-critical bandwidth of the L1 cache(s) that is (are) closer to the instruction execution, (in some applications) it is therefore desirable that the L1 cache(s) is/are shielded from snoop traffic as much as possible so as to allow uninterrupted instruction throughput. In a multi-level cache hierarchy, larger capacity upper-level caches encounter fewer performance concerns where they are a level or more removed from the instruction flow. In such a system, it may be more efficient to implement a snoop filter to preliminarily resolve the snoop requests to avoid consuming cache bandwidth.

In one embodiment, the system may send a snoop request 170 that is passed through the bus interface unit 160 to the highest level cache, in FIG. 1 the highest level is the L2 cache 150. If the snoop request 170 is resolved at the L2 cache 150, no further action is required and the snoop request terminates. If the snoop request 170 is not resolved at the L2 cache 150, then the snoop request 170 should be sent to the associated L1 cache(s) 120/140. Since the higher-level cache(s) may have a larger capacity and contain many of the lines in the L1 cache, the snoop filter hit rate should be high enough to improve the snoop efficiency while keeping snoop traffic out of the L1 cache(s). However, since it is possible that a line is cached in the L1 cache and not the upper-level cache, a miss at the L2 cache 150 should be treated as unresolved and the associated L1 cache(s) should be snooped. The snoop filter may utilize existing cache hardware, and access protocols and mechanisms to provide a snoop filter that covers the associated L1 cache(s).

Where the system contains multiple copies of a line in different levels of cache, the state of the line may not be equivalent at every level. If the state of a line is not guaranteed to be clean in each associated cache, then the response to the snoop request resolved at the L2 cache 150 may not be reliable. In one embodiment, the L2 cache 150 can track the state of the L1 cache(s) where applicable to resolve any multiple-level cache discrepancies. For example, if the L1 cache(s) uses (use) the Modified-Exclusive-Shared-Invalid (MESI) cache coherence protocol to track the status of the line in the cache, then the L2 cache 150 may be aware of that status, whether clean or dirty. Further, it may be desirable that the L2 cache 150 also maintain a cache coherence protocol to track the status of the lines stored in the L2 cache 150. Under the MESI protocol, a line is dirty if the line is modified. A line is clean if the line is exclusive or shared. While the MESI protocol is used here as an example, any other cache coherence protocol or model may be effectively implemented.

Figure 2:
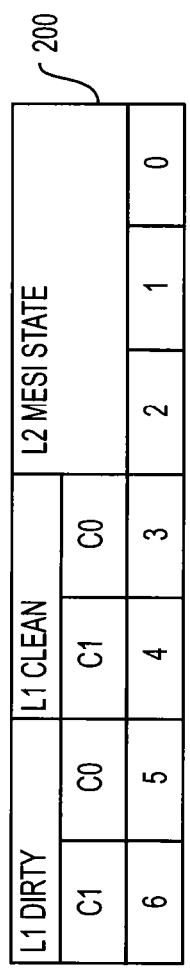
FIG. 2 shows a bit block that contains the state information of the associated cache lines.

FIG. 2 shows an example of the cache state information 200 that may be used to track line status. In the state information 200 represented by 7 bits, bits 0-2 can be used for the state of the line in the L2 cache using the MESI protocol. Bits 3-6 can be used to reflect the clean or dirty status of the L1 cache(s). If the state information 200 is accurate, the L2 cache should be able to resolve substantially every snoop request 170. The state information 200 may be maintained by a notification from the L1 cache(s) when the state of a line has changed.

Figure 3:
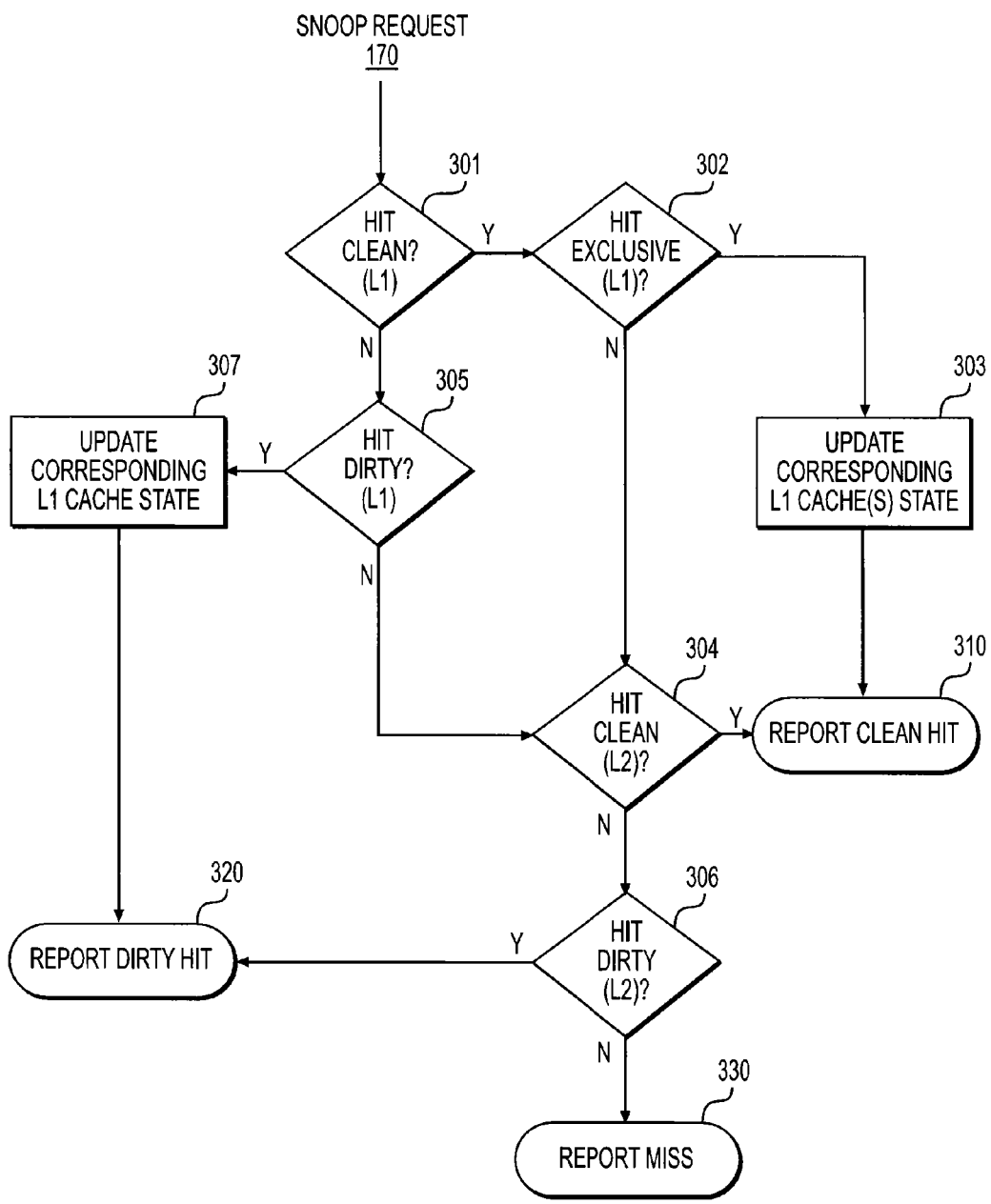
FIG. 3 shows a flowchart of the manner in which a higher level cache acting as a snoop filter responds to a system snoop request.

FIG. 3 illustrates one embodiment by which the L2 cache 150 acting as a snoop filter may resolve the snoop request 170. The snoop request 170 is provided to the L2 cache 150. At 301, the L2 cache 150 looks to the state of the L1 cache as represented by bits 3-6 in the state information 200 (only a single L1 cache is referred to here for simplicity). If the L1 cache is hit clean, the snoop filter proceeds to 302. If the L1 cache is not hit clean, the snoop filter proceeds to 305. At 302, the system checks the MESI state of the L1 cache. If the MESI state of the L1 cache is exclusive, the snoop filter (L2 cache 150) updates the corresponding L1 cache MESI state as appropriate, typically to a shared state, at 303 and returns a clean hit at 310. If the MESI state is not exclusive at 302, the snoop filter looks to the MESI state of the L2 cache 150 as provided in bits 0-2 of the state information 200 at 304. If the L2 cache is hit clean, the snoop filter reports a clean hit at 310. If the L2 cache 150 MESI state is not hit clean at 304, the snoop filter looks to see if the cache is hit dirty at 306, if not, then the MESI state is invalid, and the snoop filter reports a cache miss at 330. If the L2 MESI state is hit dirty at 306, the snoop filter reports a dirty hit at 320. If the L1 status is hit dirty at 305, the snoop filter updates the corresponding L1 cache state as appropriate at 307 and reports a dirty hit at 320.

In one embodiment, the efficiency of the system may be further improved by ensuring that the L2 cache 150 is inclusive of the associated L1 cache(s). In one embodiment, the L2 cache 150 provides for substantially 100% filter coverage, thereby eliminating substantially all snoop traffic to the L1 cache(s). For architectures that allow specifying cacheable domains, the inclusivity requirement implies that both the upper and lower-level cache should reside in the same domain. In order to achieve cache inclusivity, the L2 cache 150 may require that a) when a line is allocated in the L1 cache 120 or 140, it is also allocated in the L2 cache 150; b) when a line is replaced in the L2 cache 150, it is invalidated or replaced from all L1 caches; and c) when the state of a line changes in the L1 cache 120 or 140, the L2 cache 150 should be made aware of that change. For the allocation notification, the L2 cache 150 need not be aware of the allocation policy implemented on the lower level cache, it need only be aware of when an allocation is made. This substantially guarantees that the L2 cache 150 contains the most recent update and that there are not multiple versions of a line in different levels of cache.

Invalidating or replacing lines from the L1 cache(s) whenever a line is replaced in the L2 cache 150 may use valuable L1 cache bandwidth that may be undesirable. In one embodiment, the L1 cache(s) may be shielded from some of the requirements of maintaining inclusivity by implementing a biased line replacement policy to favor replacement of non-inclusive cache lines. This bias can be implemented by adding one or more additional bits of information to each stored cache line and can be used with any replacement algorithm. Additional unique state encodings may be implemented at the L2 cache 150 to track the L1 cache(s) status.

Figure 4:
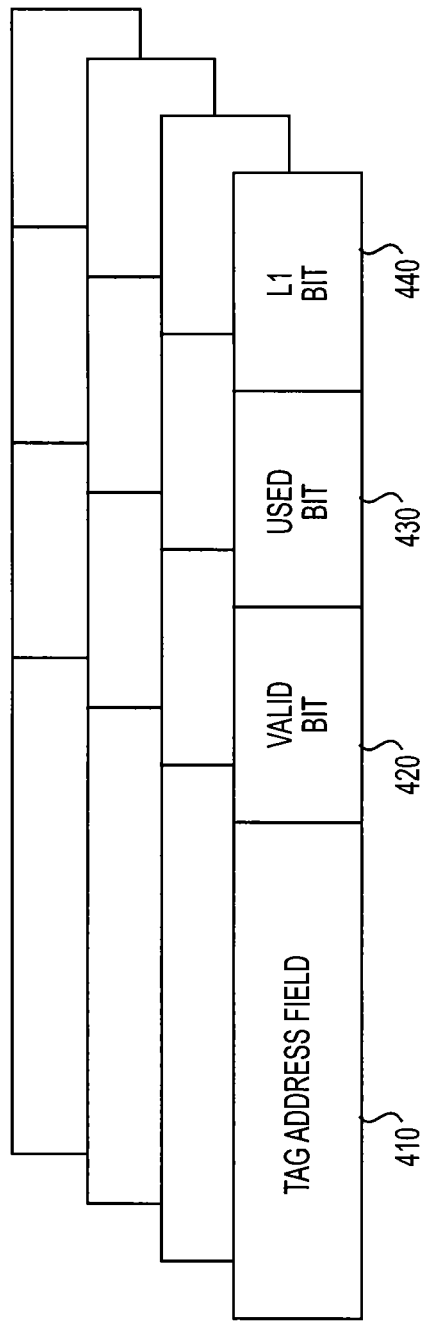
FIG. 4 shows the cache line information with an additional bit used for allocation policy biasing.

Replacing a line allocated in the cache is typically achieved by the implementation of any number of replacement policies, including Least Recently Used (LRU), Least Frequently Used (LFU), etc., with the intent of discarding the lines in the cache that are least likely to be needed in the future. FIG. 4 illustrates one possible implementation of the additional biasing bit (L1 bit 440) with a Not Recently Used (NRU) replacement policy for the allocation of lines in the L2 cache 150. Each line of the cache has a tag address field 410, a valid bit 420, a used bit 430 and an L1 bit 440. The NRU replacement policy sets the used bit 430 to 1 whenever the line is accessed. When a new line is allocated into the L2 cache 150, if that line was also filled into the L1 cache, the L1 bit 440 is set to 1. If any line is marked invalid (i.e., the valid bit 420 is set to 0), the line should be replaced first. When all the lines are valid, the first line with a 0 in the used bit 430 (i.e., the line was not recently used) and in the L1 bit 440 (i.e., the line is not also in the L1 cache), is the line that is replaced. If there is no line with a 0 in the used bit 430 and a 0 in the L1 bit 440, then the first line with a 0 in the L1 bit 440 is replaced. If all the lines have an L1 bit 440 marked with a 1, then the first line with a used bit 430 marked 0 is replaced. When all but one line has a 1 in the used bit 430, the used bit 430 of that line is set to 1 and all the other used bits 430 of the other lines are set to 0.

This may have the benefit of replacing non-exclusive lines first and shielding the L1 cache from some requirements of maintaining inclusivity.

The biasing of the replacement allocation policy can alternatively be used to implement other replacement policies beyond inclusivity. For example, the biasing of the replacement allocation policy may be used to favor replacing inclusive lines first such that two levels of cache have as few lines in common as possible, to favor replacement of non-temporal lines or to replace pre-fetched lines that have not been accessed first. Alternatively, the biasing scheme may be changed dynamically by adding additional bits or by switching to a different analysis.

Figure 5:
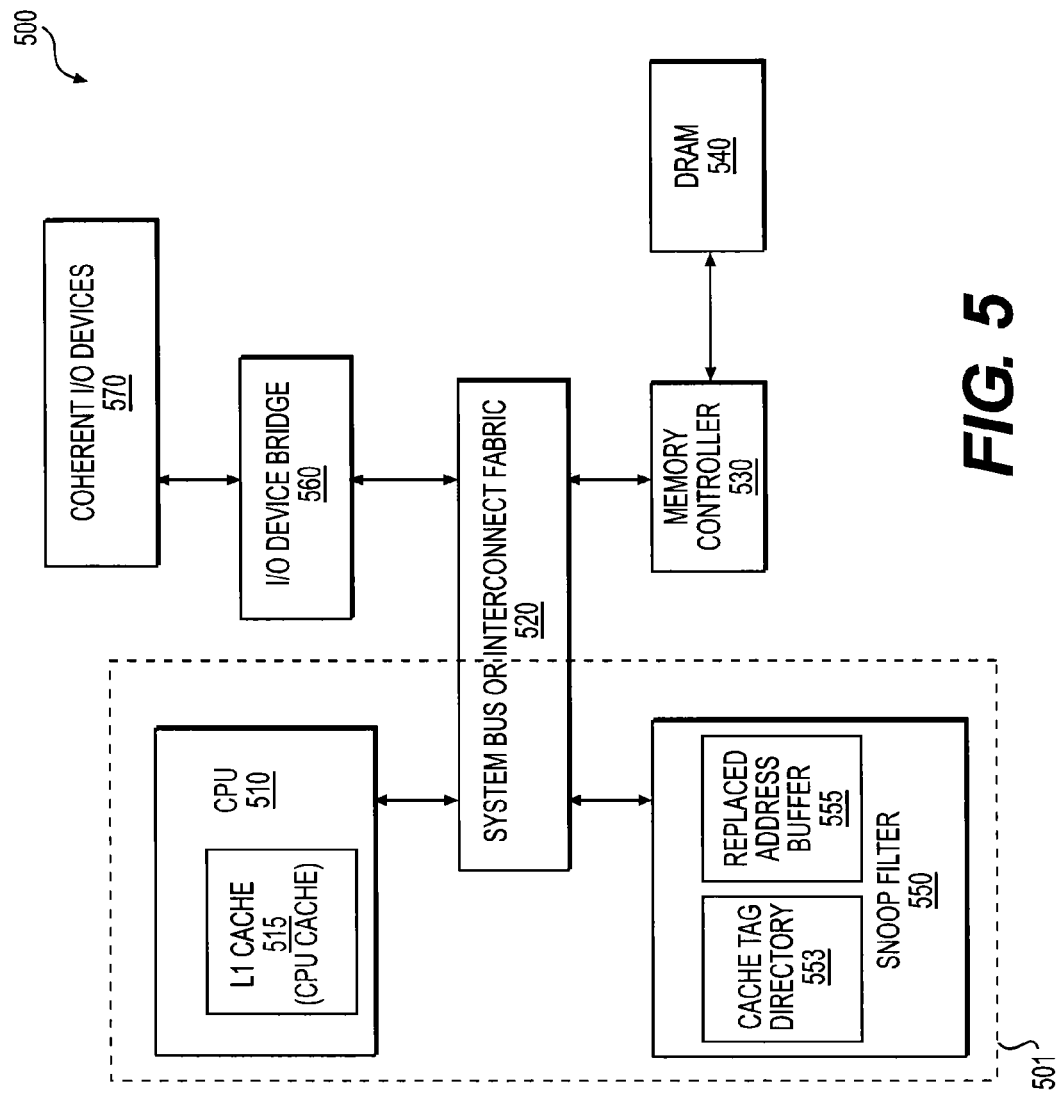
FIG. 5 shows a block diagram of a system example in which a snoop filter has been decoupled from a cache and utilizes a replacement address buffer to compensate for a latency caused by the decoupling according to an embodiment of the disclosure.

FIG. 5 shows a block diagram of a system example 500 according to an embodiment of the disclosure. The system 500 includes a CPU 510 with a L1 cache 515, and a snoop filter 550 for the L1 cache 515. The snoop filter 550 is decoupled from the CPU 510, and thus does not directly communicate with the CPU 510 or the L1 cache 515 to track and mirror the status of cache lines in the L1 cache 515. In the FIG. 5 example, the system 500 includes a system bus 520 (or interconnect fabric) configured to interconnect various components in the system 500, such as the CPU 510, the snoop filter 550, a memory controller 530, an input/output (I/O) device bridge 560 and the like. The snoop filter 550 is configured to observe information on the system bus 520, and operate accordingly to achieve substantially 100% snoop resolution for the L1 cache 515.

In an embodiment, the CPU 510 is implemented as a CPU core module having the L1 cache 515 inside the CPU core module. In an example, the CPU 510 is coupled to the system bus 520 via a bus interface unit (not shown).

Further, in an embodiment, the snoop filter 550 is implemented in an L2 cache. The L2 cache is configured to act as one or more snoop filters. In an example, the system 500 includes another CPU (not shown) with its own L1 cache (not shown) inside. The L2 cache is then configured to act as snoop filters for the L1 cache 515 and the L1 cache inside the other CPU.

The CPU 510 and the snoop filter 550 do not need direct channels to enable the snoop filter 550 to track the status of cache lines in the L1 cache 515. Thus, the snoop filter 550 can be placed separately from the CPU 510. In an embodiment, the CPU 510 and the snoop filter 550 are implemented on different integrated circuit (IC) chips. The two IC chips are suitably coupled to the system bus 520. In another embodiment, the CPU 510 and the snoop filter 550 are implemented on a same IC chip, for example an IC chip 501, but do not have direct connections. The CPU 510 and the snoop filter 550 are both coupled to the system bus 520. According to an embodiment of the disclosure, due to the decoupling, the snoop filter 550 does not exactly mirror the status of cache lines in the L1 cache 515 at all times. For example, there may be a delay between a state change in the L1 cache 515 and a state change in the snoop filter 550. In another example, a state change may happen in the L1 cache 515 without being known to the snoop filter 550.

The memory controller 530 is configured to manage a flow of data going to and coming from a main memory, for example, a dynamic random access memory (DRAM) 540. The memory controller 530 can be a separate chip.

The I/O device bridge 560 interfaces suitable I/O devices, for example, coherent I/O devices 570, with the system bus 520.

In the FIG. 5 example, the snoop filter 550 includes a cache tag directory 553 and a replaced address buffer 555. The snoop filter 550 observes information on the system bus 520, and operates based on the information to enable substantially 100% snoop resolution.

According to an aspect of the disclosure, the snoop filter 550 is configured to have an organization that matches the associated cache, such as the L1 cache 515. Specifically, the cache tag directory 553 is configured to have a matching organization, such as a matching number of ways, as the L1 cache 515. It is noted that the cache tag directory 553 does not need to exactly mirror the L1 cache 515 structure. In an example, the ways in the cache tag directory 553 can respectively correspond to the ways in the L1 cache 515, however, the ways in the cache tag directory 553 are ordered differently from their corresponding ways in the L1 cache 515.

In an embodiment, the snoop filter 550 monitors the system bus 520 for read transactions to fill one or more ways in the L1 cache 515. At the time the snoop filter 550 observes a read transaction, the snoop filter 550 is then informed of the allocating cache way information in the L1 cache 515. In an example, the L1 cache 515 is configured to release allocating cache way information on the system bus 520 when a read transaction is performed, and the snoop filter 550 receives the allocating cache way information from the system bus 520. Accordingly, the snoop filter 550 updates the cache tag directory 553. For example, the snoop filter 550 updates a way in the cache tag directory 553 that corresponds to the allocating cache way in the L1 cache 515. Thus, the snoop filter 550 has the matching organization as the L1 cache 515.

According to another aspect of the disclosure, the snoop filter 550 is configured to maintain all replaced lines marked 'dirty' and respond 'dirty' to snoops of the replaced lines until the associated writeback (e.g., main memory update) for those lines occurs. Specifically, in an example, during a read transaction, the L1 cache 515 replaces an allocated cache way with read data from the main memory. The replaced address buffer 555 is configured to buffer the replaced address of any location that is not definitely known to be clean in the L1 cache 515. Thus, in an example, the replaced address buffer 555 does not buffer the replaced address when a writeback to the main memory for that address actually occurs. In another example, the replaced address buffer 555 does not buffer the replaced address when the actual state of the replaced line is known from a response of a snoop with the replaced address to the L1 cache 515.

In an embodiment, the operations of the replaced address buffer 555, for example, the buffering of dirty replacement addresses, ensure the snoop filter 550 to still cover all addresses in the L1 cache 515 including those pending writeback to memory (e.g. posted-writes). The buffering of clean replaced addresses that are not definitely known to be clean in the L1 cache 515 covers cases where the replaced addresses in the L1 cache 515 may have silently transitioned from a clean state to a dirty state unknown to the snoop filter 550, for example, a transition of an Exclusive (E) state line to a Modified (M) state governed by the MESI protocol. Generally, the E state is a clean state and the M state is a dirty state. In an embodiment, the E-state is not sufficient information given that the snoop filter 550 needs to determine whether the replaced address requires buffering while awaiting a writeback to the main memory. Specifically, since the snoop filter 550 is not coupled with the associated L1 cache 515, the L1 cache 515 may transition from the E state to the M state without the snoop filter 550's knowledge. Thus, in an example, the replaced address buffer 555 buffers replacement addresses with the E state until write-backs actually occur or until the actual states are known via snooping to the L1 cache

515. With the snoop filter 550 suitably managing these specific scenarios, the snoop filter 550 can achieve substantially 100% snoop resolution.

Further, when the snoop filter 550 receives a snoop with an address, the snoop filter 550 is configured to report a hit when the address has matching entry in either the cache tag directory 553 or the replaced address buffer 555. In an embodiment, the snoop filter 550 is configured to clear a buffered replaced address when the snoop filter 550 observes that the corresponding line has been written back to the main memory. However, in an example, the associated line was not dirty, and thus the writeback does not occur thus leaving the replaced address buffered in the snoop filter 550 indefinitely. In this example, the snoop filter 550 is configured to identify such buffered replaced addresses, and generate a snoop with the buffered replaced addresses to the L1 cache 515. When a response indicates that a replaced address does not exist in the L1 cache 515, the snoop filter 550 deallocates the buffered replaced address. Thus, the snoop filter 550 does not errantly report a hit when the snoop filter 550 receives a snoop with that address.

According to another aspect of the disclosure, the snoop filter 550 is configured to track the dirty and shared status of its associated cache lines in the L1 cache 515 in order to avoid unnecessary probes (e.g., snoops to the L1 cache 515) related to line replacements. In an embodiment, the snoop filter 550 is implemented with a common coherence policy that includes a dirty state (e.g., denoted as Modified or M-state in policies such as MESI, MEI, etc.), then the snoop filter 550 only buffers a replaced dirty line address until the snoop filter 550 observes that the line in the L1 cache 515 of the address is written back to the main memory.

In another example, the snoop filter 550 is implemented with a common coherence policy that includes a shared state (e.g., denoted as Shared or S-state in standard coherence policies such as MESI), then a clean line replacement tracked as shared in the snoop filter does not require buffering at all on replacement (e.g., the snoop filter 550 can definitely determine that the associated cache line is still clean in its associated cache(s) and will be replaced without writeback to memory). When the snoop filter 550 does not support tracking the shared and/or dirty status, the snoop filter 550 can send an investigative probe (e.g., a snoop) to its associated cache(s) on replacements.

Further, according to another aspect of the disclosure, the snoop filter 550 is also agnostic of its associated cache(s) allocation policy. The cache allocation policy can be allocate-on-miss or allocate-on-fill. In an example, the associated cache, such as the L1 cache 515 determines which associative way will be allocated on-miss, and reports to the snoop filter 550 on the request to the main memory. Thus, the snoop filter 550 can determine the corresponding way in the cache tag directory 553 and update accordingly. Any other related cache operations may be delayed to occur at the time of the actual line-fill (e.g., evicting a replaced dirty line for instance).

In addition, in an example, because the snoop filter 550 has matching associativity and organization as the L1 cache 515, the snoop filter 550 can provide the cache(s) way information on update operations (e.g., state transitions, invalidations, etc.) to avoid unnecessary access of the L1 cache 515 and thus can save power and avoid latency. For example, the L1 cache 515 covered by the snoop filter 550 does not require tag access to determine which way to update as the way is known due to snoop filter 550 organization.

Figure 6:
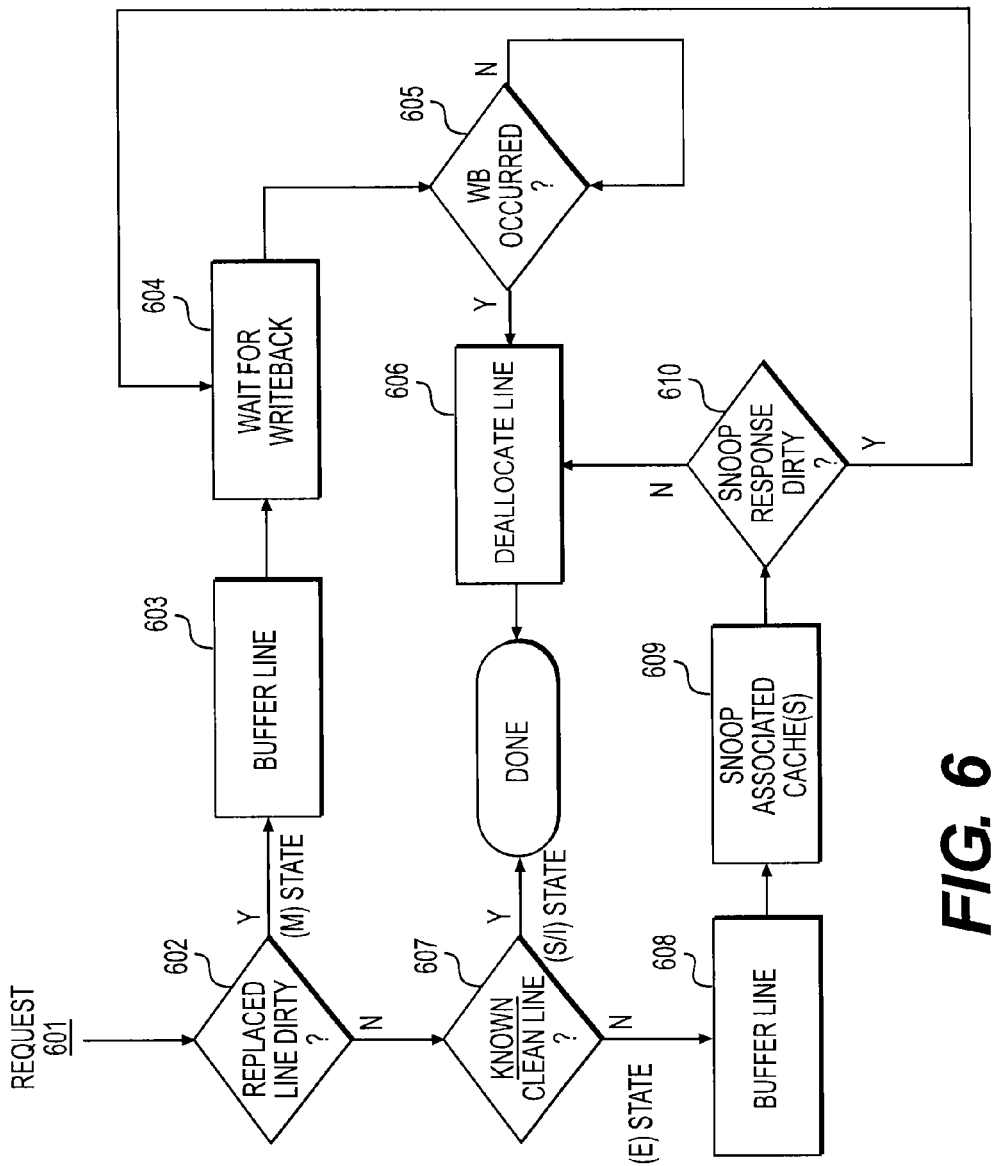
FIG. 6 shows a flow chart for replaced address buffering according to an embodiment of the disclosure.

FIG. 6 shows a flow chart for replaced address buffering according to an embodiment of the disclosure, assuming the MESI protocol is used. A request 601 for a line replacement is received by the snoop filter 550. In an example, the snoop filter 550 is implemented in a L2 cache, and the L2 cache receives, from the system bus 520, a request 601 with a replaced address of a line. In another example, the snoop filter 550 observes the system bus 520 and detects the request 601 on the system bus 520, the request 601 is with one or more replaced addresses of lines. At 602, the snoop filter 550 determines whether the line being replaced is dirty (in a modified or M state), for example, based on information in the cache tag directory 553. When the line being replaced is dirty, the replaced address of the line is buffered in the replaced address buffer 555 at 603. Then the snoop filter 550 waits for observing a write-back from the L1 cache 515 to for example the main memory (e.g., the DRAM 540), at 604. If a write-back (WB) has occurred at 605, the replaced address of the line is deallocated from the replaced address buffer 555 at 606 and no further action is required. If the line being replaced is not dirty at 602, and if the line is known to be clean at 607 (the MESI state is shared(S) or invalid (I)), no further action is required and no replaced address need be buffered.

If the line is not positively known to be clean (the MESI state is exclusive (E)) at 607, the replaced address of the line is buffered in the replaced address buffer 510 at 608. The snoop filter 550 then generates a snoop with the replaced address to the associated cache, such as the L1 cache 515 at 609. If the snooped response status is dirty, at 610, the snoop filter 550 waits for a write-back from the L1 cache 510 to the main memory at 604. If the snooped response status is not dirty at 610, the replaced address of the line can be deallocated from the replaced address buffer 555 at 606. It is noted that the snoop filter 550 can be a traditional snoop filter or can be an L2 cache.

Figure 7:
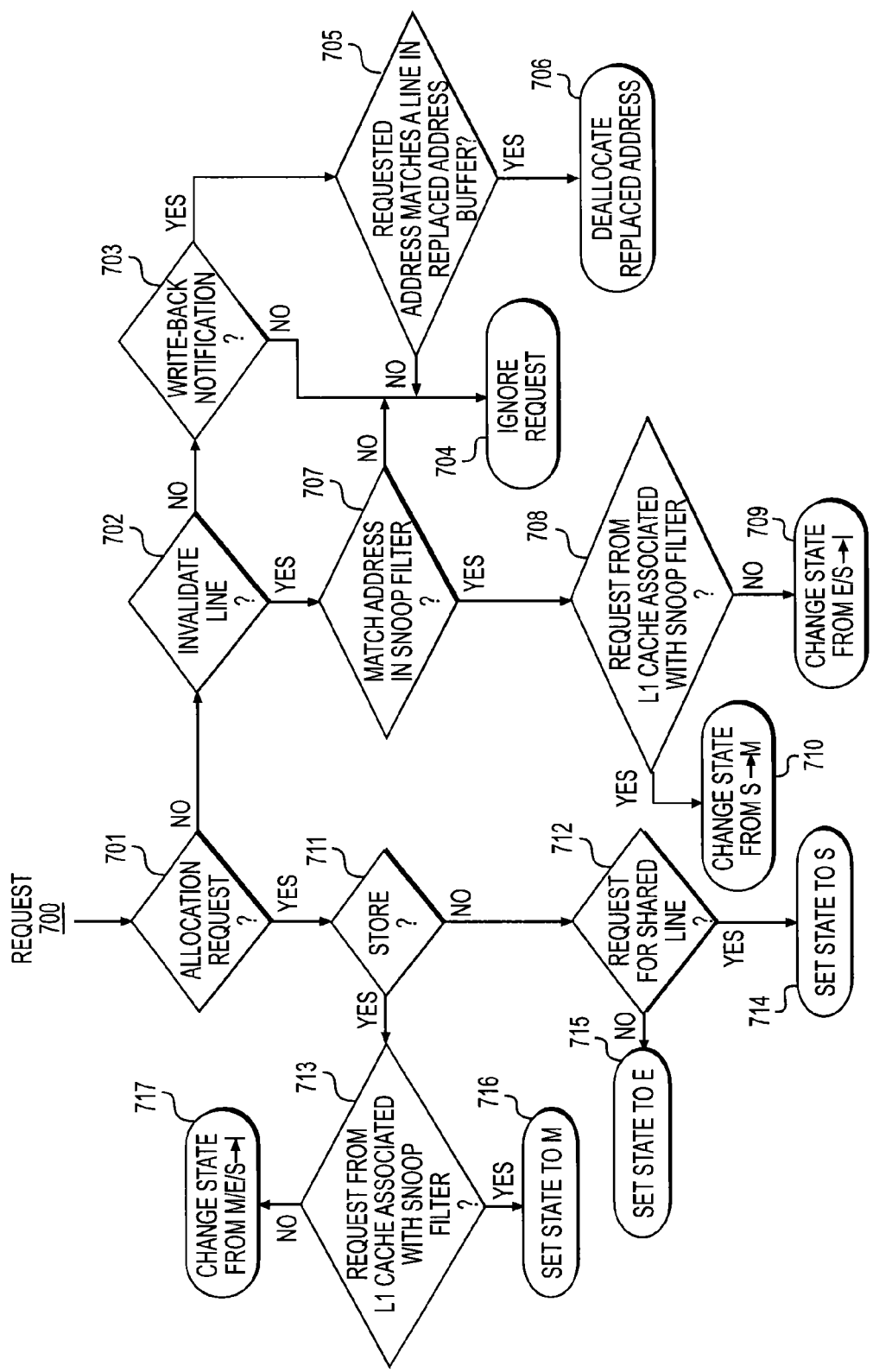
FIG. 7 shows a flow chart for managing state information in a decoupled snoop filter upon receipt of an address request.

FIG. 7 shows a flowchart for managing state information in a decoupled snoop filter, such as managing the cache tag directory 553 of the snoop filter 550, upon receipt of a request, and shows how one embodiment may be implemented to respond to a request received at the snoop filter. A request 700 with an address is received by the snoop filter 550 at 701. In an example, the snoop filter 550 is implemented in an L2 cache. The L2 cache receives the request 700 with the address from the system bus 520. In another example, the snoop filter 550 observes the system bus 520 and receives the request 700 to other circuit modules from the system bus 520. If the request 700 is an allocation request, then a read operation has been performed and the snoop filter 550 determines if the request 700 is a store at 711. If the request 700 is not a store, the snoop filter 550 determines if the request is for a shared line at 712. If the request is for a shared line, the state of the line at the snoop filter 550 is set to S (shared) at 714. If the request is not for a shared line at 712, the state is set to E (exclusive) at 715. If, at 711, the request 700 is a store request, and if at 713 the request is from a L1 cache associated with the snoop filter, then the state of the line is set to M (modified) at 716. If the request is not from an associated cache at 713, then the status of the line is set to I (invalid) at 717.

If at 701, the request 700 received by the snoop filter 550 is not an allocation request, and at 702 is an invalidate line request, then if the requested line does not match an address in the snoop filter 550 at 707, the request is ignored at 704. If the requested line does match an address in the snoop filter 550 at 707, and if the request is from an L1 cache associated with the snoop filter 550 at 708, then at 710 the state of the line is set to M (modified). If the request is not from an associated L1 cache at 708, then the state of the line is set to I (invalid). If the request 700 is not to invalidate a line at 702, and if the request is not a write-back notification at 703, the request 700 is ignored at 704. If the request 700 is a write-back notification at 703, and if the requested address matches a line in the replaced address buffer at 705, then the replaced address is deallocated from the buffer at 706. If there is not a match in the replaced address buffer at 705, then the request 700 is ignored at 704.

One or more of the steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

The above embodiments were described with only two levels of cache for simplicity. However, any number of levels of cache may be used. For example, in a cache hierarchy with three or more levels of cache, the highest level of cache may be implemented as a snoop filter for the lower two levels. Alternatively, a mid-level cache may be used as a snoop filter for the lowest-level cache if the system design makes such an implementation feasible. In addition, one or more steps of the flowcharts discussed above may be performed in a different order (or concurrently) to achieve desirable results.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:
    receiving, by a snoop filter, requests on a system bus, the snoop filter being decoupled from an associated cache such that the associated cache changes states of lines in the cache from a first state that is a clean state to a second state that is not a clean state without the snoop filter's knowledge;
    buffering, by the snoop filter, addresses of replaced lines in the associated cache that are unknown to be clean;
    matching an organization of a directory of the snoop filter with an organization of the associated cache; and
    receiving an identification of a cache way to be filled at a time the snoop filter observes a read transaction of the cache.

2. The method of claim 1, further comprising:
    receiving, by the snoop filter, an identification of a cache way to be filled at a time the snoop filter observes a read transaction of the cache.

3. The method of claim 1, further comprising:
    buffering an address of a replaced line until a write-back associated with that replaced line occurs to a memory of the system.

4. The method of claim 1, further comprising:
    deallocating a buffered address in the snoop filter when a write-back associated with that buffered address occurs to a memory of the system.

5. The method of claim 1, wherein the first state is an exclusive (E) state and the second state is a modified (M) state.

6. The method of claim 1, further comprising:
    allocating a corresponding location in the directory of the snoop filter based on the identification of the cache way to be filled.

7. The method of claim 6, further comprising:
    reporting a hit to a snoop with an address that has a matching address in the directory or that matches a buffered address.

8. The method of claim 1, further comprising:
    buffering an address of a replaced line in the associated cache until a state of that replaced line is certain.

9. The method of claim 8, further comprising:
    generating a snoop with an address of a replaced line to the associated cache to determine the state of that replaced line; and
    deallocating a buffered address of a replaced line when that replaced line does not exist in the associated cache.

10. An apparatus comprising:
    a snoop filter decoupled from an associated cache of the apparatus such that the associated cache changes states of lines in the cache from a first state that is a clean state to a second state that is not a clean state without the snoop filter's knowledge, wherein the snoop filter includes a buffer configured to buffer addresses of replaced lines in the associated cache that are unknown to be clean, the snoop filter further includes a directory configured such that an organization of the directory matches an organization of the associated cache, the snoop filter being configured to receive an identification of a cache way to be filled at a time the snoop filter observes a read transaction of the associated cache.

11. The apparatus of claim 10, wherein the buffer is configured to buffer an address of a replaced line until a write-back associated with that replaced line occurs to a memory of the apparatus.

12. The apparatus of claim 10, wherein the buffer is configured to deallocate a buffered address when a write-back associated with that buffered address occurs to a memory of the apparatus.

13. The apparatus of claim 10, wherein the first state is an exclusive (E) state and the second state is a modified (M) state.

14. The apparatus of claim 10, wherein the snoop filter is configured to allocate a corresponding location in the directory of the snoop filter based on the identification of the cache way to be filled.

15. The apparatus of claim 14, wherein the snoop filter is configured to report a hit to a snoop with an address that has a matching address in the directory or in the buffer.

16. The apparatus of claim 10, wherein the buffer is configured to buffer an address of a replaced line until a state of that replaced line is certain.

17. The apparatus of claim 16, wherein the snoop filter is configured to generate a snoop with an address of a replaced line to the associated cache to determine the state of that replaced line, and the buffer is configured to deallocate a buffered address of a replaced line when that replaced line does not exist in the associated cache.

* * * * *